(12) United States Patent
Keil et al.

(10) Patent No.: US 7,953,639 B2
(45) Date of Patent: May 31, 2011

(54) CUSTOMIZED EXTENSIONS OF ELECTRONIC DATABASE OBJECTS

(75) Inventors: Roland Keil, Ubstadt-Weiher (DE); Michael Witte, Dossenheim (DE); Martin Semmler, Angelbachtal (DE)

(73) Assignee: SAP AG, Walldorf (DE)

( * ) Notice: Subject to any disclaimer, the term of this patent is extended or adjusted under 35 U.S.C. 154(b) by 1369 days.

(21) Appl. No.: 11/387,211

(22) Filed: Mar. 23, 2006

(65) Prior Publication Data

US 2007/0226068 A1   Sep. 27, 2007

(51) Int. Cl.
*G06Q 30/00* (2006.01)
(52) U.S. Cl. .......................................... 705/26; 705/37
(58) Field of Classification Search ............... 705/26, 705/37
See application file for complete search history.

(56) References Cited

U.S. PATENT DOCUMENTS

| | | | |
|---|---|---|---|
| 5,844,554 A * | 12/1998 | Geller et al. | .................. 715/744 |
| 6,195,794 B1 | 2/2001 | Buxton | |
| 2003/0225937 A1 | 12/2003 | Reiss et al. | |

OTHER PUBLICATIONS

Frank Dignum, E-commerce in production: Some experiences Integrated Manufacturing Systems. Bradford: 2002. vol. 13, Iss. 5; p. 283, 12 pgs, downloaded from ProQuestDirect on the Internet on May 22, 2010, 19 pages.*
"Customizing Transaction Models and Mechanisms in a Programmable Environment Supporting Reliable Workflow Automation" by Georgakopoulos et al., *IEEE Transactions on Knowledge and Data Engineering*, vol. 8, No. 4, Aug. 1996, pp. 630-649.
"Customizing System Software Using OO Frameworks" by Nayeem Islam, for *Research Feature*, Feb. 1997, pp. 69-78.

* cited by examiner

*Primary Examiner* — James Zurita
(74) *Attorney, Agent, or Firm* — Fish & Richardson P.C.

(57) ABSTRACT

A computer-implemented method for configuring a customized extension for an electronic product transaction database object class includes receiving user-initiated input that selects a set type predefined for at least one electronic product database object class that defines a product type for which instances of the electronic product database object class may be created. The method also includes associating the selected set type with a selected electronic product transaction database object class used in a computer-executed product transaction process and for which instances of the electronic product transaction database object may be created. The selected set type is to serve as a customized extension for the selected electronic product transaction database object class when a product that is defined by a product database object class that uses the selected set type is identified in the computer-executed product transaction process.

8 Claims, 9 Drawing Sheets

CUSTOMIZED EXTENSIONS OF ELECTRONIC DATABASE OBJECTS

TECHNICAL FIELD

This invention relates to configuring and using customized extensions of electronic database objects.

BACKGROUND

Many enterprise computing systems are used for performing transaction processes that relate to products. In such a system, there may be database objects that relate to different products, or product models, defined in the system. In addition, there may be database objects for a particular transaction, such as a sales order transaction, that relates to a product.

An enterprise may use what is commonly referred to as product master data for each product type it sells. The product master data itself may be a database object class definition for a particular product type. For example, in a scenario where the enterprise is an automobile company, there may be a different product database object class definition, for each model and year of automobile in the company's inventory. An instance of this product database object class may represent a single automobile that has been ordered or manufactured. Such a product object instance may, for example, document the value of different attributes for the particular automobile, such as the color of the car being red for example.

Because a single enterprise may create product master data for many different product types, or models, it is common to use what may be referred to as a set type that may be associated with the product master data for one or more different product types, or models. A set type may be associated with master data for multiple different product models, and may define one or more attributes, allowable values for the attributes, and in some cases, default values for the attributes that are common for all of the product master data with which the set type is associated. For example, in the automobile scenario, there may be a product master set type for color, and the set type may define that the allowable colors are red, green and blue, and that a default color is red. When creating master data for a particular product model, a user configuring the master data may select a set type that has been previously created for use with the master data for many different products, instead of creating a new color attribute definition for each product model's master data.

Generally, a product transaction process may involve the creation of a product transaction object instance of a predefined product transaction object class. For example, in the automobile company scenario previously mentioned, there may be a sales order transaction process database object class that defines attributes included in all sales orders, as well as allowable values, and in some cases default values, for the defined attributes. During execution of the product transaction process, an instance may be created of the product transaction process database object class, and the created transaction object instance may include all information needed for the sales order, such as a definition of one or more product types that are included in the sales order.

It is very common that software vendors provide a standard transaction processing software package that will need to be customized by a customer of the software package to meet the customer's particular needs. This may be done by the customer creating "extensions" to the standard software package. An extension may be a defined object class referred to as an extension object class. An extension object class may be created and associated with a particular transaction database object class that is being customized. Extension objects for a product transaction database object may, for example, include attributes and attribute values that are to be used in the customized product transaction process, and in some cases, may involve attributes and attribute values used in product master data.

Managing the customization of standard software packages has long been a challenging task. This is especially true for transaction processing systems that may involve many different types of product transaction processing database object classes and product database object classes. Creating, managing, and maintaining customized extensions in this environment is a particularly difficult task.

SUMMARY

In one aspect, this document describes a computer-implemented methods for configuring a customized extension for an electronic product transaction database object class. In addition, this document describes computer program products and systems used in the execution of the methods.

In one aspect, the method for configuring a customized extension for an electronic product transaction database object class includes receiving user-initiated input that selects a set type predefined for at least one electronic product database object class that defines a product type for which instances of the electronic product database object class may be created. The method also includes associating the selected set type with a selected electronic product transaction database object class used in a computer-executed product transaction process and for which instances of the electronic product transaction database object may be created. The selected set type is to serve as a customized extension for the selected electronic product transaction database object class when a product that is defined by a product database object class that uses the selected set type is identified in the computer-executed product transaction process.

In various implementations, the method for configuring a customized extension may include one or more of the following features. The computer-executed product transaction process may be a product ordering process used in ordering a product defined by the product database object class. The set type may define attributes, possible attribute values, or default attribute values for a product defined by the electronic product database object class. In such a case, the set type may be predefined for multiple different product database object classes that each define a different product class. Each defined product class may define a different product model that has a set of attributes, attribute values and default attribute values defined by an electronic database object class. Each different product model may be a different automobile model that has a set of attributes, attribute values and default attribute values defined by an electronic database object class.

Also, the method may further include receiving user-initiated input that selects whether or not the selected set type is to be used for the selected product transaction database object class independent of whether or not a product identified in the computer-executed product transaction process uses the selected set type. In addition, the method may include providing a display of a check box to prompt user selection of whether or not the selected set type is to be used for the selected product transaction database object class independent of whether or not a product identified in the computer-executed product transaction process uses the selected set type.

In another aspect, this document describes a method for performing a computer-executed product transaction process, as well as computer program products and systems used in executing the method. The method in this aspect includes creating an instance of a predefined electronic product transaction database object class for which a customized extension has been defined. The method also includes receiving information that selects, for the created product transaction database object instance, a product for which an electronic product database object class is defined that uses a predefined set type configured to serve as the customized extension for the predefined product transaction database object class. The method also includes using, in the computer-executed product transaction process, the set type for the defined product database object class as the customized extension of the product transaction database object class.

In various implementations, the method for performing a product transaction process may include one or more of the following features. The computer-executed product transaction process may be a product ordering process used in ordering a product defined by the product database object class. The set type may define attributes, possible attribute values, or default attribute values for a product defined by the electronic product database object class. In such a case, the set type may be predefined for multiple different product database object classes that each define a different product class.

The computer program products described above and in the following detailed description may include executable program instructions tangibly embodied in an information carrier, such as program memory. When the program instructions are executed, for example by a processor, the methods described above and in the following description are executed.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
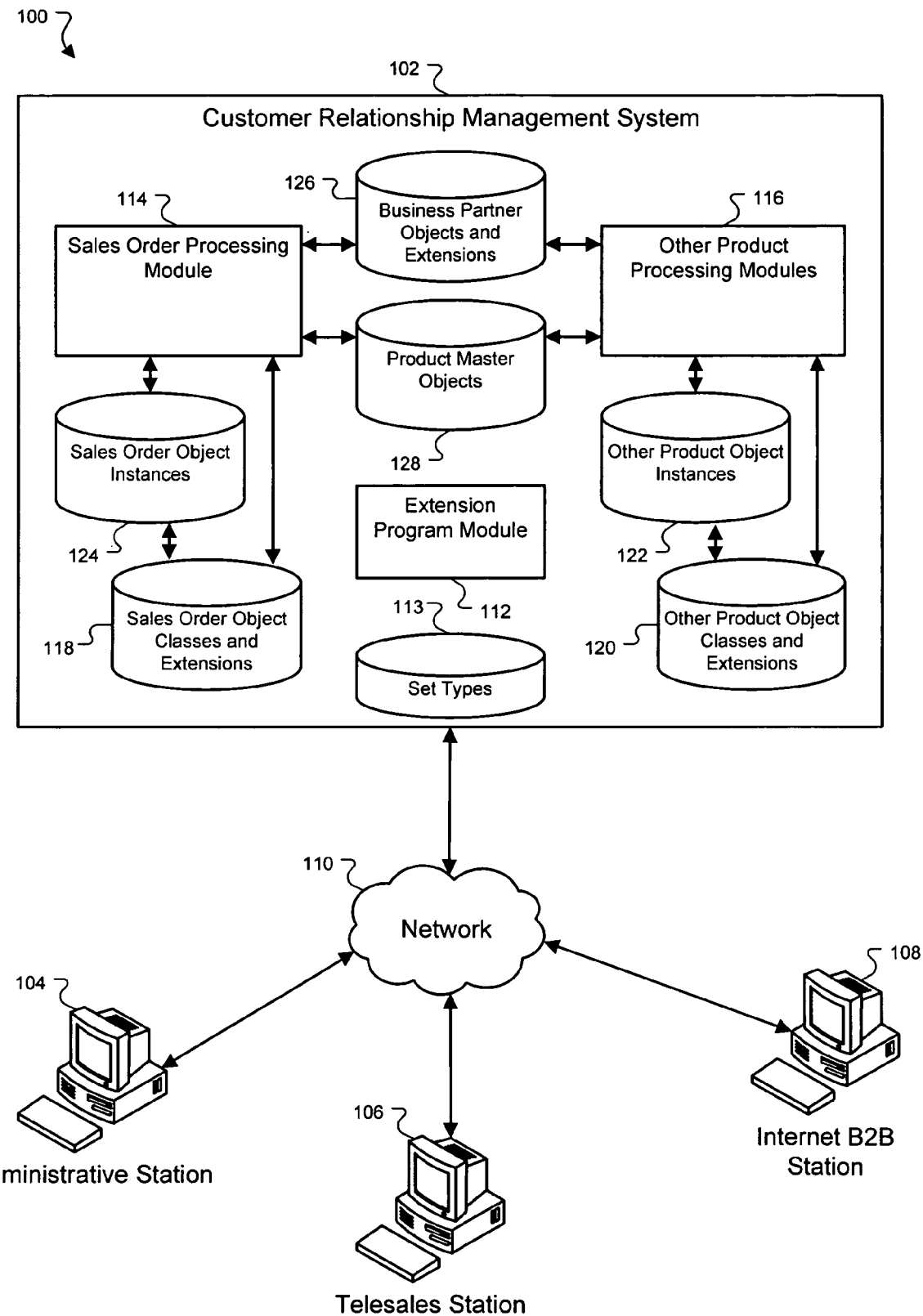
FIG. 1 is a block diagram of an exemplary system for creating customized extensions of electronic database objects.

FIG. 1 shows an exemplary system 100 for configuring and using customized extensions of product transaction processing database objects. The system 100 includes a customer relationship management (CRM) computing system 102 networked with several exemplary user stations, namely, an administrative station 104, a telesales station 106, and an Internet business-to-business (B2B) station 108. The CRM computing system 102 is, in general, a system that manages customer interactions (e.g., marketing, sales, service, etc.), and is one example of a computing system in which the customized extension techniques described in this document may be used. A communications network 110, such as a local area network (LAN), a wide area network (WAN), or the Internet, connects the CRM system 102 and the user stations 104, 106, and 108.

Administrators of the CRM system 102 may create customized extensions using the administrator station 104. A customized extension may be an additional user-defined attribute for a defined database object, and/or user-defined allowed and/or default values for the attribute. An extension program module 112 may provide a graphical user interface (GUI) where an administrator can create customized extensions of product transaction database objects, such as sales orders or sales order quotes. An administrator may make an input that selects a predefined product transaction database object class, stored for example as an object class in repository 118.

The administrator may make an input that selects, from among many predefined product master set types stored in repository 113, a set type to be used for the customized extension to be created. A set type for a product database object, such as an automobile, may describe valid color values for a color attribute. The set type allows an end user, such as a user of the telesales station 106 or the Internet B2B station 108, to select a color of a car. A set type may be optional or mandatory. A set type may have a default value, such as a default color of "red" for the color attribute. A particular predefined set type may be used or associated with the product master data for more than one product.

If the set type selected to be used for a customized extension of a product transaction database object is a product master type of set type, meaning it was created for use by product master data, it is possible to achieve an easy integration of product master data and product transaction data. For example, a set type that describes the color of product database objects corresponding to vehicles may be used to create a customized extension of product transaction database objects that represent sales orders and sales quotes for vehicles.

A sales order transaction processing module 114 may process a sales order transaction for a product and create a sales order transaction object instance in the process. Other product processing modules 116 may process other transactions that also relate to products, such as a manufacturing process or a logistics and delivery process. For the sales order processing module 114, a sales order object class is defined and is stored in repository 118, along with any extensions defined for the sales order object class. Object instances of sales order transactions that are created during processing of the sales order processing module 114 are shown stored in repository 124. Similar to the sales order transaction processing, for the other product processing modules 116, other product transaction object classes are defined and are stored in repository 120, along with any extensions defined for the other product transaction object classes. Object instances of the other product transactions that are created during processing by module 116 are shown stored in repository 122.

Product master data for a particular product type or model, which itself may be a product object class, may be created and stored in repository 128. When a new product model, such as a new car model for example, is added to a company's inventory, the master data may be created that defines the attributes for the product, allowed values for the attributes, and in some cases default values for the attributes. An instance of a product database object may also, but not necessarily, be created and stored in a repository 128. Each product master data class definition may include an association to one or more predefined set types stored in repository 113. As discussed previously, a set type may be associated with master data for multiple different product models, and may define one or more attributes, allowable values for the attributes, and in some cases, default values for the attributes that are common for all of the product model master data with which the set type is associated. For example, in an automobile scenario, there may be a product master set type for color, and the set type may define that the allowable colors are red, green and blue, and that a default color is red. When creating master data for a particular product model, a user configuring the master data may select a set type that has been previously created for use with a prior-year automobile model for example instead of creating a new color attribute definition.

Figure 2:
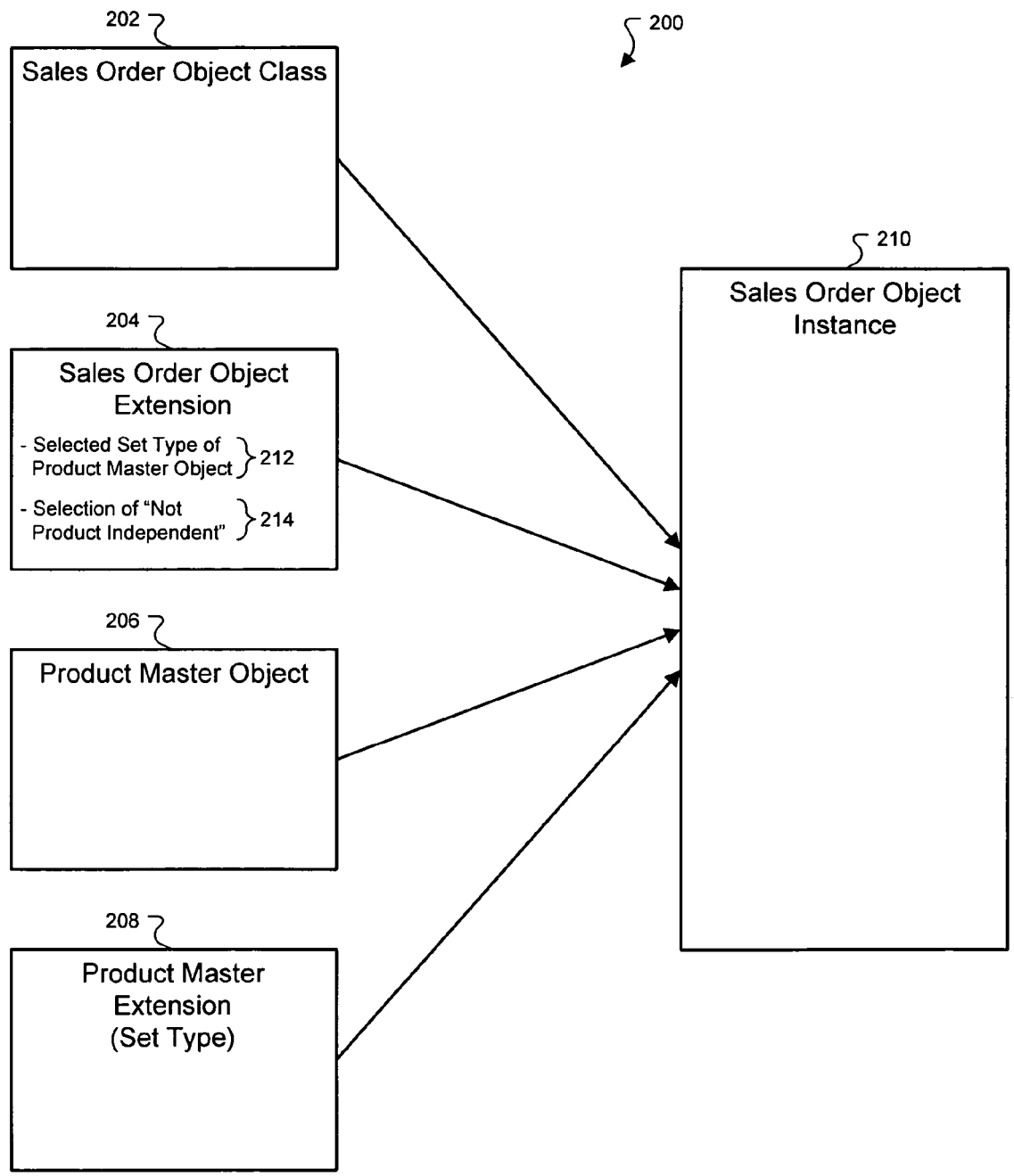
FIG. 2 is block diagram of an exemplary data model showing customized extensions of electronic database objects.

Business partner objects and extensions stored in repository 126 may contain information, such as billing and addressing information for business partners, for example, customers. Business partner object instances may be created or referred to using a business partner class definition, when a sales order is made, and the business partner object instance may be referenced in a sales order object instance FIG. 2 shows an example of a data model 200 where a sales order transaction object class 202, a sales order transaction object extension 204, a product master object class 206, and a product master set type 208 (which also may be referred to as an extension) are used in the creation of a sales order object instance 210. In this example, the sales order object extension 204 has been defined for the sales order object class 202. In addition, a defined product master set type 208 has been associated with the particular master data object 206 and hence makes up a part of the master data object 206.

As is seen in FIG. 2, the sales order object extension 204 includes a first definition 212 that identifies, or associates, the set type 208 of the product master object 206, and that is to be used as a customized extension for the sales order object class 202. In addition, the sales order object extension 204 also includes a second definition 214 that the extension 204 is "not product independent." This means that the sales order object extension 204 will not be used if the product master object for a product selected in a sales order transaction process does not use the set type 208 (which is not the case for the example shown in FIG. 2). In FIG. 2, though, because the product master object 206 does use the set type 208, the sales order object extension 204 will be used in the transaction processing that creates the sales order object instance 210.

In one example, the product master object 206 may represent a vehicle product and the product master set type 208 may define a color attribute for the vehicle. The set type 208 may also define that a particular color value, such as red, is a default value. This may be the default value because most of the vehicles that are produced are the color red. As such, because the sales order object class 202 includes the set type 208 as its defined extension 204, the color red may be inherited into the product transaction process so that a user is presented with a default color red when entering information about a vehicle being purchased. The ability to manage and maintain object extensions in this manner provides an easy and flexible way to configure and maintain the default vehicle color information. The default vehicle color set type may be referenced by multiple different product transaction processes, and an administrator may update the default vehicle color for all of these product transaction processes by changing the default within the vehicle color set type.

Figure 3:
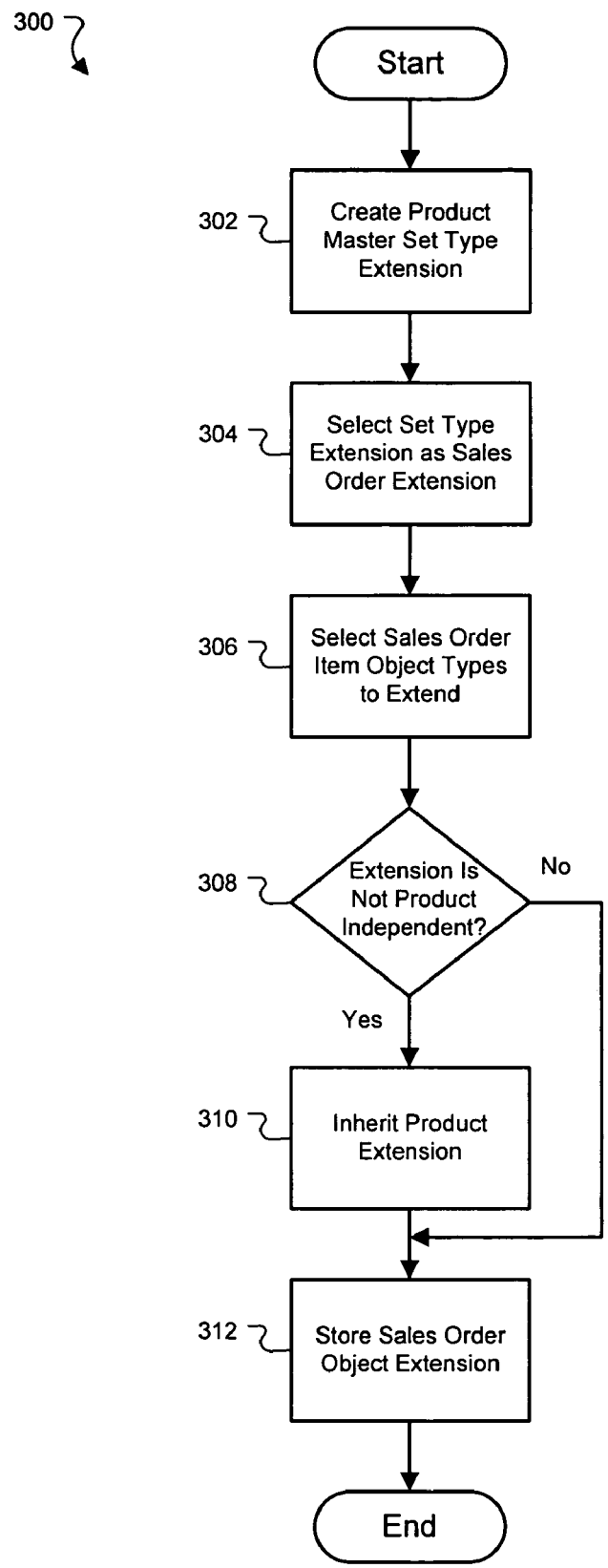
FIG. 3 is a flow chart showing exemplary steps for implementing customized extensions of electronic database objects.

FIG. 3 depicts an exemplary configuration, or customizing, process 300 for implementing customized extensions of sales order objects. FIGS. 4A-D show a series of GUI screen snapshots that further illustrate the process 300. A processor executing instructions stored in a computer program product, for example, can perform the process 300. For example, extension program module 112 shown in the FIG. 1 example may execute the process 300. The process 300 begins with the creation, in step 302, of a set type for product master data. The set type may define an attribute of a product that describes the product in more detail, such as a set type for the color of a vehicle. The set type may be created as a sales order extension is created, or alternatively, the product master set type may be created at some time prior to the creation of a sales order extension. The extension module 112 in the system 100 of FIG. 1 may provide a GUI, which an administrator may use to describe the product master object 206 in more detail. The administrator may use the GUI to define the product master set type 208, or alternatively, to associate an existing set type with new product master data being defined.

Figure 4A:
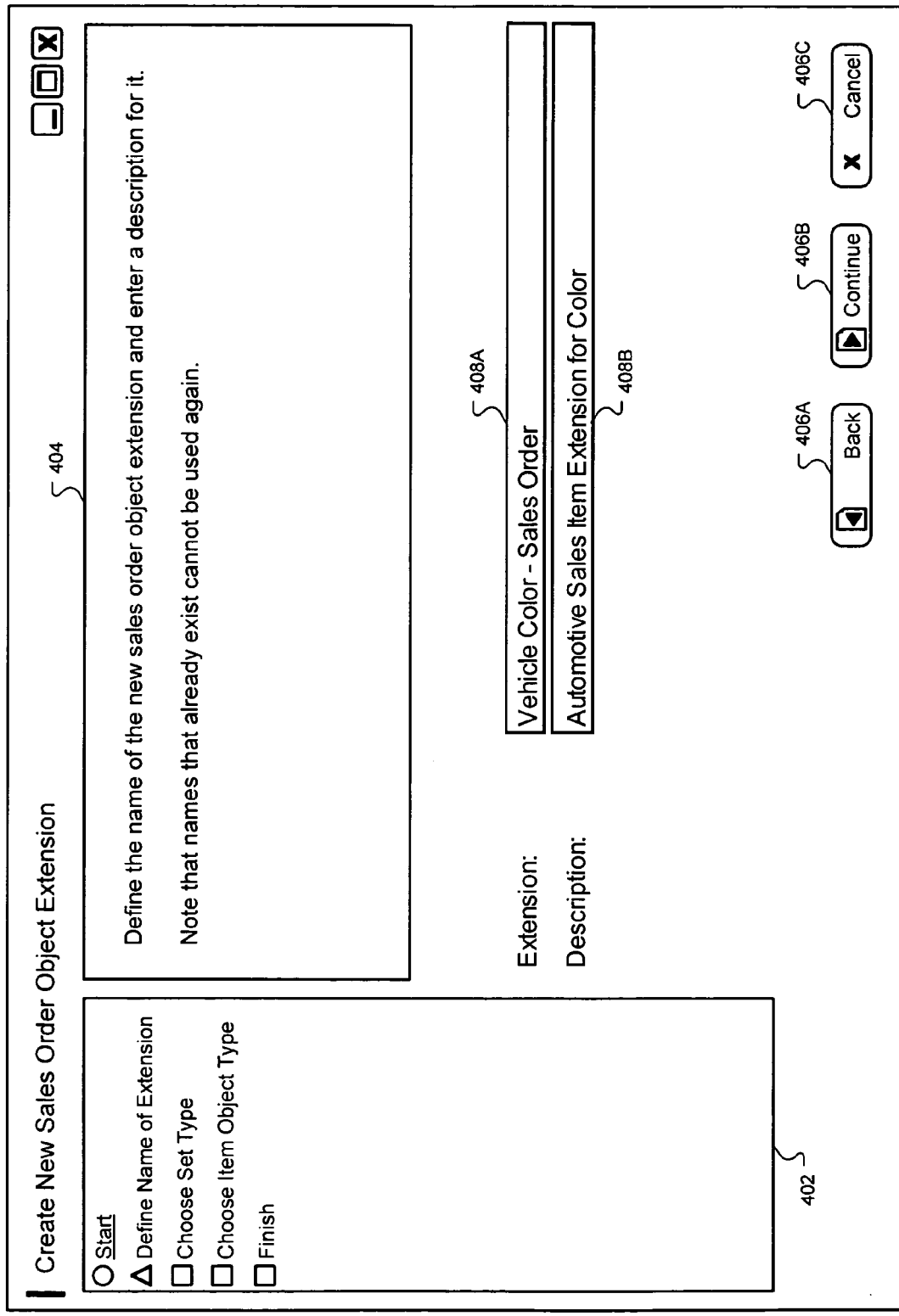
FIG. 4A is an exemplary graphical user interface (GUI) for naming a customized extension of electronic database objects.

Next, the predefined set type is selected, in step 304, for a sales order transaction object extension. To illustrate an example of how this may be performed, FIG. 4A shows an exemplary GUI 400 where an administrator may name a new sales order object extension. The GUI 400 includes an area 402 that presents the progress of the extension creation process and an area 404 that presents messages to the administrative user. Navigation buttons 406A, 406B, and 406C allow the user to move back, forward, and cancel, respectively, the extension creation process. Fields 408A and 408B allow the administrator to specify a name and a description for the sales order object extension being configured.

Figure 4B:
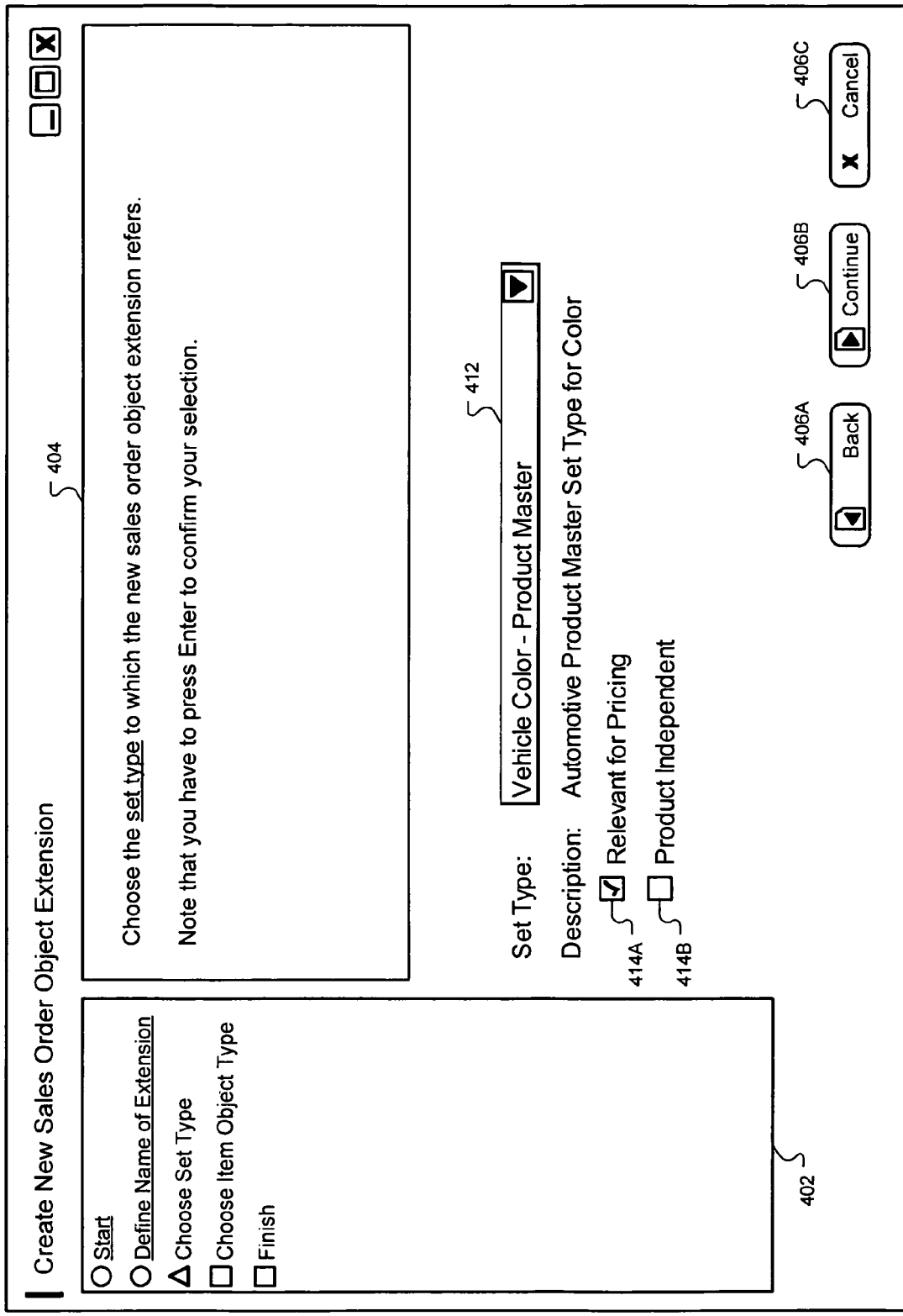
FIG. 4B is an exemplary GUI for configuring a data model set type to be used with the customized extension.

Also, FIG. 4B shows an exemplary GUI 410 that allows an administrator to select a set type for the sales order object extension using an input control 412. The input control 412 in this example is a pull-down list showing the available set types (stored in repository 113, for example) from which the administrator may choose. Here, the administrator has selected the set type, "Vehicle Color—Product Master." The GUI 410 also contains input controls 414A and 414B. The input control 414A, "Relevant for Pricing," indicates that the selection of a particular value for the set type in an instance of the sales order will affect the price of the product. The flag "relevant for pricing" may prepare a sales order transaction object, for example, so that the extension being configured can be used to influence prices and discounts of a sales order transaction process.

The input control 414B, "Product Independent," allows an administrator to select whether or not there will be an integration of the product master extension (set type) to the sales order transaction object extension being configured. This makes sense only in a case where at least one product master also uses the selected set type. If on the other hand, the selected set type is not a set type for a product master, then the sales transaction object extension being configured may be product independent by default. If the input control 414B is not checked, then during sales order transaction processing, the corresponding data from the product master will be defaulted to the sales order transaction process.

Figure 4C:
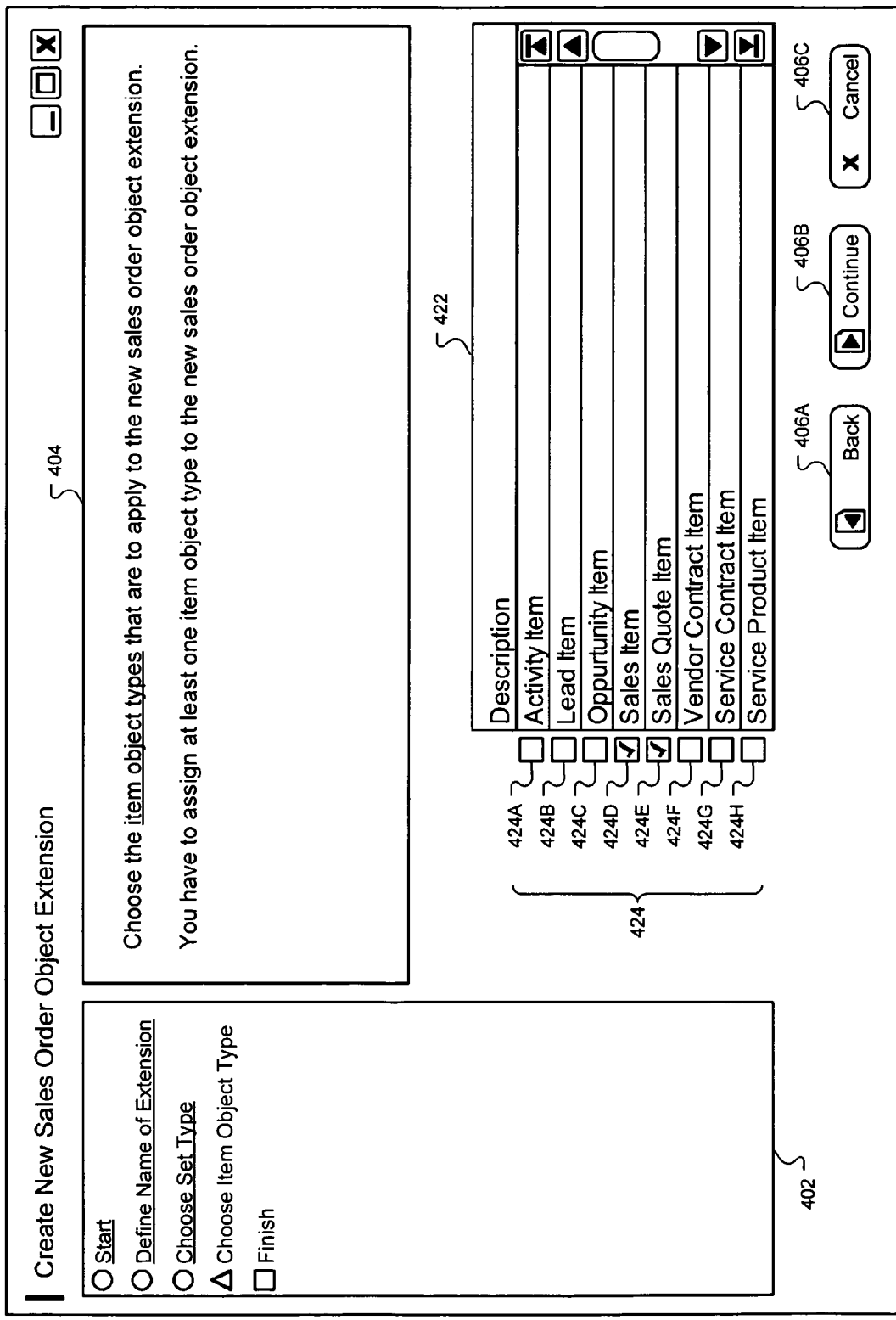
FIG. 4C is an exemplary GUI for specifying types of electronic database objects that the customization extends.

Referring back to FIG. 3, one or more sales order item object types are selected, in step 306, to extend using the thus-far configured sales order extension. Item object types may be, for example, a sub-class of a product transaction object class. FIG. 4C shows, for example, an exemplary GUI 420 that allows an administrator to select from a list 424, a number of different sales order item object types to which the sales order object extension is to apply. The GUI 420 includes an input control 424 where the administrator may select the sales order item object types. Here, the sales order extension applies to sales item objects and sales quote item objects, as indicated by check boxes 424D and 424E, respectively. The sales order extension for vehicle color does not affect activity, leads, opportunities, vendor contracts, service contracts, and service product item objects. Therefore, check boxes 424A, 424B, 424C, 424F, 424G, and 424H corresponding to these item objects, respectively, are not selected.

Figure 4D:
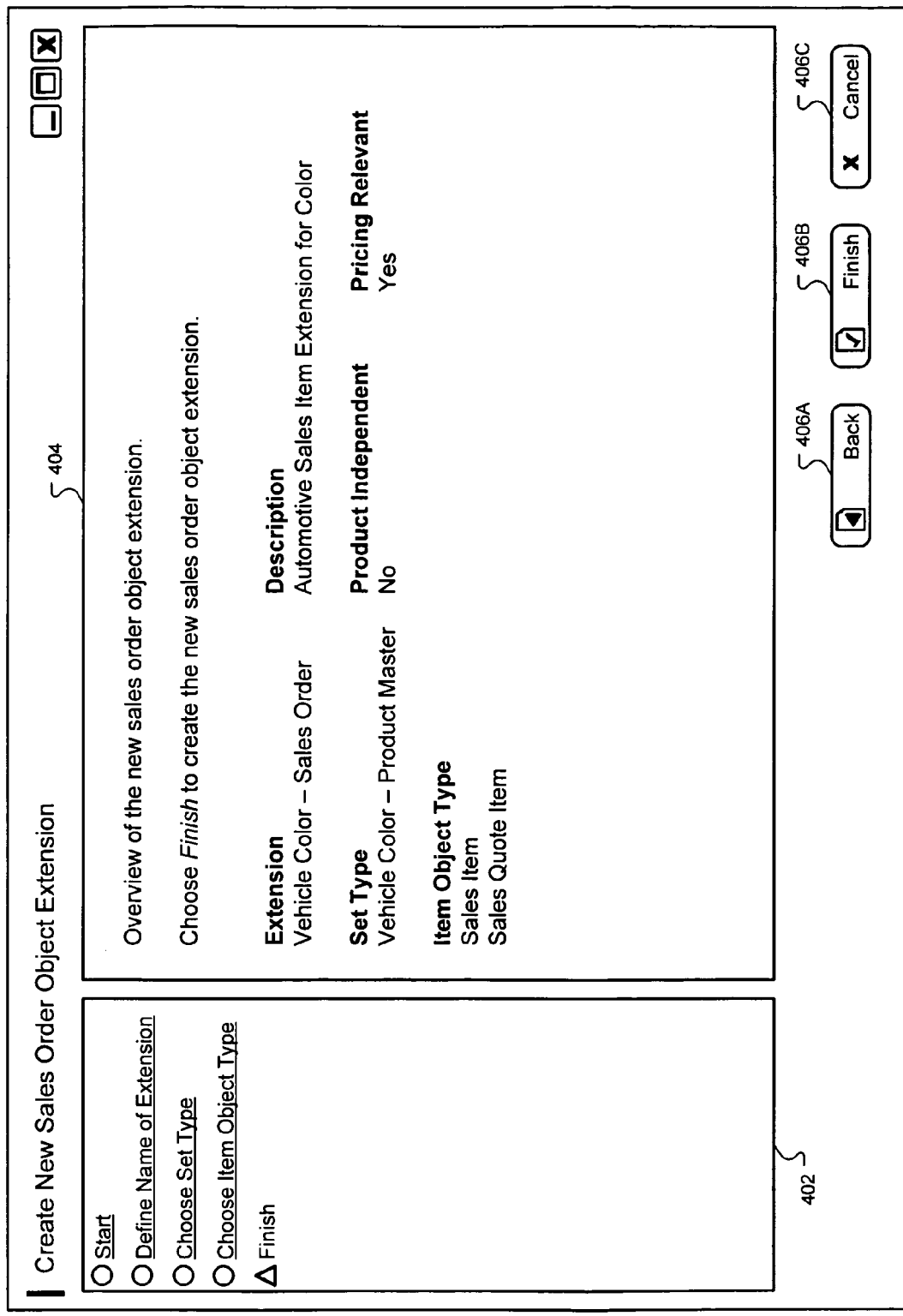
FIG. 4D shows an exemplary GUI that presents a summary of the sales order extension for vehicle color.

In step 308, if the sales order extension is selected to be not product independent (for example, see FIG. 4B), then the process 300 proceeds to step 310 where the sales order extension inherits attributes from the product extension, or alternatively, creates a link or association that the extension attributes are inherited during run-time. Otherwise, if the sales order extension is product independent, then the operations proceed to step 312 where the sales order extension is stored. For example, FIG. 4D shows an exemplary GUI 430 that presents a summary of the sales order extension for vehicle color. The vehicle color sales order extension is not product independent and will therefore inherit attributes from the vehicle color product extension. An administrator may select the control 406B to complete the creation of the sales order extension and store it for later use by end users.

In summary, the process 300 shown in FIG. 3 allows a user to select a set type for a sales order extension, which may be a set type that is also used by a product extension, and, in addition, the user may also select the specific sales order item types to extend. In addition, values of attributes included in set types referenced by the sales order extensions may default to values specified in the product extension if the user designates the sales order object extension as product dependent. This provides a single location for the user configuration of an attribute, such as the available colors of a vehicle, that may be used by multiple product extensions and sales order or other product transaction object extensions. Additionally, a single default value for an attribute may be specified by the user within a product extension and the default value may be referenced by a sales order extension, such as the sales order extension for vehicle color defaulting to the color red from the product extension for vehicle color.

Figure 5:
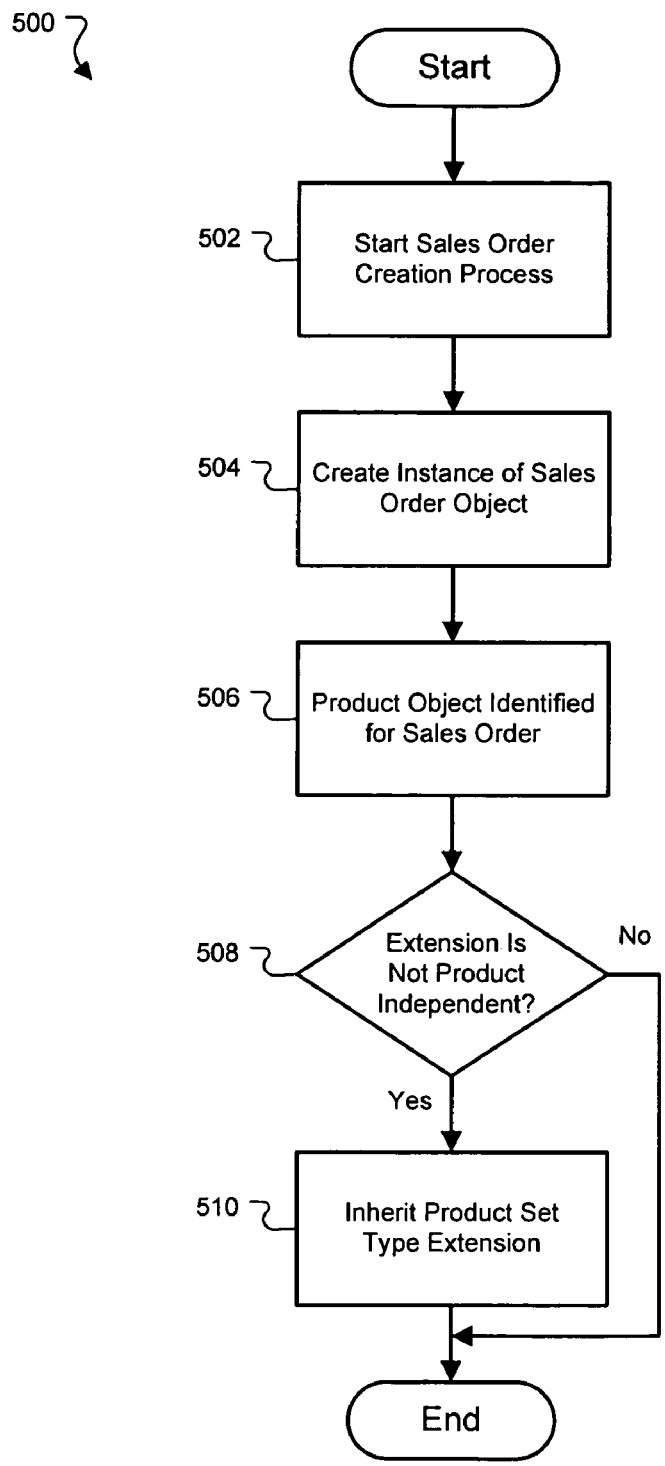
FIG. 5 is a flow chart showing exemplary steps for implementing product transaction processing.

FIG. 5 depicts an exemplary run-time process 500 that makes use of customized extensions of electronic database objects. A processor executing instructions stored in a computer program product can perform the process 500. For example, the sales order processing model 114 may be executed by the process 500. The process 500 begins, in step 502, with the initiation of the sales order creation process. For example, a user of the telesales station 106 or the Internet B2B station 108 (operated by a car dealer, for example) may use a GUI provided by the sales order processing module 114 to create a sales order. The creation of the sales order may be in response to a request from a buyer to buy a product.

An instance of the sales order object, including the sales order extension, is created, in step 504. For example, the sales order processing module 114 may retrieve the requested sales order object class 202 and the sales order extension 204 from the repository 118 and create the sales order object instance 210.

A product object is identified, in step 506, for the sales order. For example, the sales order processing module 114 may identify, under user control, a particular product that a buyer wants to purchase, where the product has a product master object 206 stored in the repository 128. The product master object 206 uses a product master extension 208 (set type).

In step 508, if the sales order extension is not product independent, then the process 500 proceeds to step 510 where the sales order extension inherits attributes of the product extension set type and the process 500 ends. Otherwise, if the sales order extension is not product independent the process 500 ends. The attributes inherited by the sales order extension are reflected in the sale order instance. For example, the sales order processing module 114 may update the sale order object instance 210 based on the dependence of the sales order object extension 204 on the product master extension 208, such as copying a default vehicle color from the product master extension 208 to the sales order object extension 204.

Figure 6:
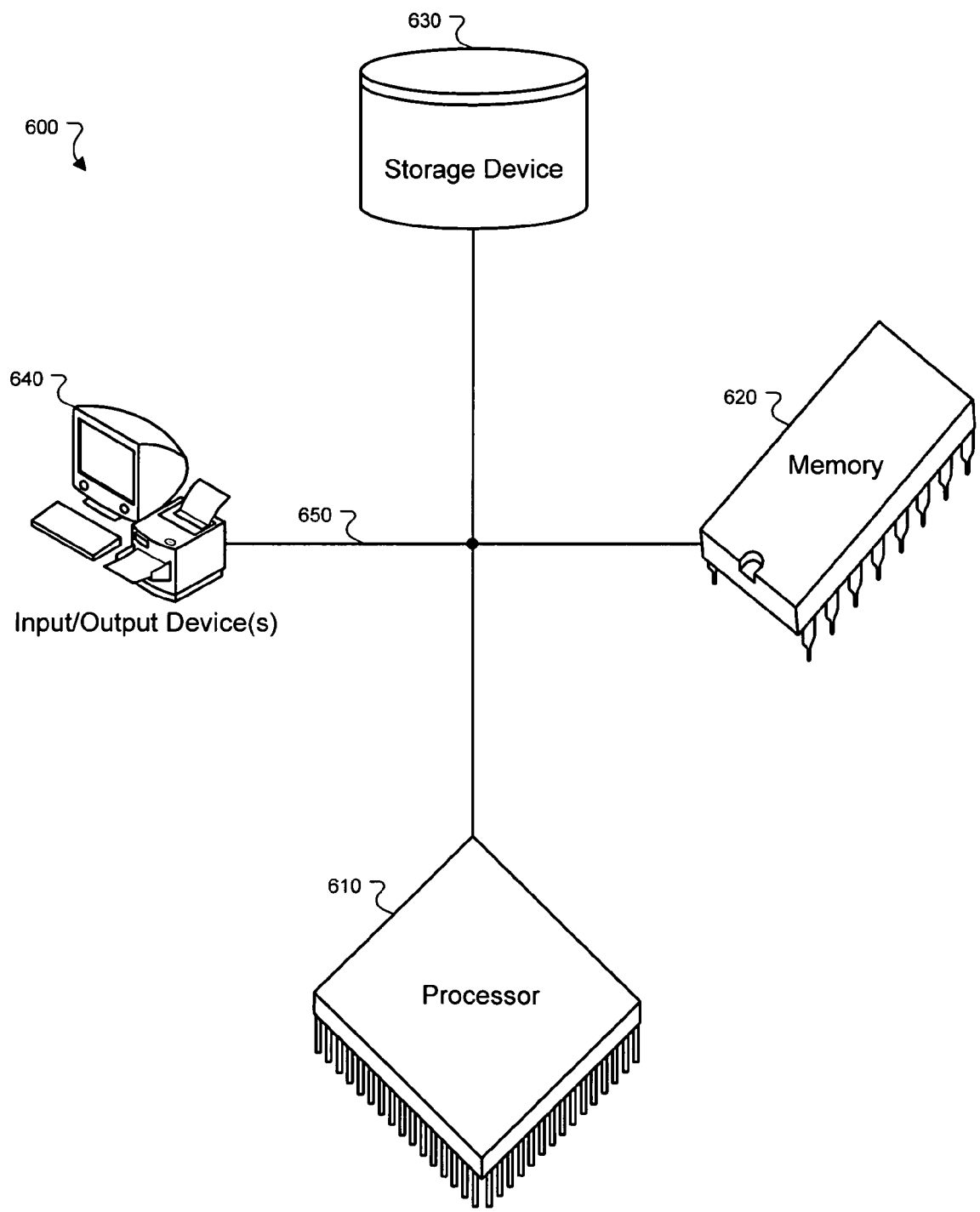
FIG. 6 is a schematic diagram of a generic computer system.

FIG. 6 is a schematic diagram of a generic computer system 600. The system 600 can be used for the operations described in association with methods 300 and 500 according to one implementation. For example, the system 600 may be included in either or all of the customer relationship management system 102, the administrator station 104, the telesales station 106, and the Internet B2B station 108.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for configuring a customized extension for an electronic database object, the method comprising:
receiving one or more first user inputs for creating a set type, wherein the set type is an electronic database object that represents an attribute of one or more types of products that are for sale, and wherein the first user inputs specify one or more allowed values for the set type and a default value for the set type;
storing the set type;
receiving one or more second user inputs for creating a first product master class, wherein the first product master class is an electronic database object that represents a first type of product that is for sale and the set type represents the attribute of the first type of product, and wherein the second user inputs associate the set type with the first product master class;
storing the first product master class;
receiving one or more third user inputs for creating a first sales order class, wherein the first sales order class is an electronic database object that represents a first type of sale for one or more products, and wherein the third user inputs associate the set type with the first sales order class and specify that the association of the set type with the first sales order class is dependent on the set type being used by a product master class of a type of product that is purchased during the type of sale represented by the first sales order class;
storing the first sales order class;
receiving a first user request to create a first sales order instance for the first sales order class, wherein the first sales order instance is an electronic database object that is an instance of the first sales order class and represents a sale of one or more products that have the first type of product represented by the first product master class;
determining, in response to receiving the first user request, that the association of the set type with the first sales order class is dependent on the set type being used by the first product master class;
determining, in response to determining that the association of the set type with the first sales order class is dependent on the set type being used by the first product master class, that the first product master class uses the set type;
applying, in response to determining that the first product master class uses the set type, the allowed values and the default value for the set type to the first sales order instance; and
storing the first sales order instance.

2. The computer-implemented method of claim 1, further comprising:
receiving one or more fourth user inputs for creating a second product master class, wherein the second product master class is an electronic database object that represents a second type of product that is for sale that is different from the first type of product, and wherein the second product master class does not use the set type;
storing the second product master class;
receiving a second user request to create a second sales order instance for the first sales order class, wherein the second sales order instance is an electronic database object that is an instance of the first sales order class and represents a sale of one or more products that have the second type of product represented by the second product master class;
determining, in response to receiving the second user request, that the association of the set type with the first sales order class is dependent on the set type being used by the second product master class;
determining, in response to determining that the association of the set type with the first sales order class is dependent on the set type being used by the second product master class, that the second product master class does not use the set type;

wherein, in response to determining that the second product master class does not use the set type, the allowed values and the default value for the set type are not applied to the second sales order instance; and storing the second sales order instance.

3. The computer-implemented method of claim 2, further comprising:

receiving one or more fifth user inputs for creating a second sales order class, wherein the second sales order class is an electronic database object that represents a second type of sale for one or more products, and wherein the fifth user inputs associate the set type with the second sales order class and specify that the association of the set type with the second sales order class is independent of the set type being used by a product master class of a type of product that is purchased during the second type of sale represented by the second sales order class;

storing the second sales order class;

receiving a third user request to create a third sales order instance for the second sales order class, wherein the third sales order instance is an electronic database object that is an instance of the second sales order class and represents a sale of one or more products;

determining, in response to receiving the third user request, that the association of the set type with the second sales order class is independent of the set type being used by a product master class of a type of product that is purchased during the second type of sale represented by the second sales order class;

applying, in response to determining that the association of the set type with the second sales order class is independent of the set type being used by a product master class of a type of product that is purchased during the second type of sale represented by the second sales order class, the allowed values and the default value for the set type to the third sales order instance; and storing the third sales order instance.

4. The computer-implemented method of claim 3, further comprising providing a display of a first check box to prompt a user to input at least one of the third user inputs for specifying that the association of the set type with the first sales order class is dependent of the set type being used by a product master class of a type of product that is purchased during the first type of sale represented by the first sales order class, and a second check box to prompt a user to input at least one of the fifth user inputs for specifying that the association of the set type with the second sales order class is independent of the set type being used by a product master class of a type of product that is purchased during the second type of sale represented by the second sales order class.

5. A computer program product comprising executable program instructions that when executed, perform operations for configuring a customized extension for an electronic database object, the operations comprising:

receiving one or more first user inputs for creating a set type, wherein the set type is an electronic database object that represents an attribute of one or more types of products that are for sale, and wherein the first user inputs specify one or more allowed values for the set type and a default value for the set type;

storing the set type;

receiving one or more second user inputs for creating a first product master class, wherein the first product master class is an electronic database object that represents a first type of product that is for sale and the set type represents the attribute of the first type of product, and wherein the second user inputs associate the set type with the first product master class;

storing the first product master class;

receiving one or more third user inputs for creating a first sales order class, wherein the first sales order class is an electronic database object that represents a first type of sale for one or more products, and wherein the third user inputs associate the set type with the first sales order class and specify that the association of the set type with the first sales order class is dependent on the set type being used by a product master class of a type of product that is purchased during the type of sale represented by the first sales order class;

storing the first sales order class;

receiving a first user request to create a first sales order instance for the first sales order class, wherein the first sales order instance is an electronic database object that is an instance of the first sales order class and represents a sale of one or more products that have the first type of product represented by the first product master class;

determining, in response to receiving the first user request, that the association of the set type with the first sales order class is dependent on the set type being used by the first product master class;

determining, in response to determining that the association of the set type with the first sales order class is dependent on the set type being used by the first product master class, that the first product master class uses the set type;

applying, in response to determining that the first product master class uses the set type, the allowed values and the default value for the set type to the first sales order instance; and storing the first sales order instance.

6. The computer program product claim 5, further comprising:

receiving one or more fourth user inputs for creating a second product master class, wherein the second product master class is an electronic database object that represents a second type of product that is for sale that is different from the first type of product, and wherein the second product master class does not use the set type;

storing the second product master class;

receiving a second user request to create a second sales order instance for the first sales order class, wherein the second sales order instance is an electronic database object that is an instance of the first sales order class and represents a sale of one or more products that have the second type of product represented by the second product master class;

determining, in response to receiving the second user request, that the association of the set type with the first sales order class is dependent on the set type being used by the second product master class;

determining, in response to determining that the association of the set type with the first sales order class is dependent on the set type being used by the second product master class, that the second product master class does not use the set type;

wherein, in response to determining that the second product master class does not use the set type, the allowed values and the default value for the set type are not applied to the second sales order instance; and storing the second sales order instance.

7. The computer program product of claim 6, further comprising:

receiving one or more fifth user inputs for creating a second sales order class, wherein the second sales order class is an electronic database object that represents a second type of sale for one or more products, and wherein the fifth user inputs associate the set type with the second sales order class and specify that the association of the set type with the second sales order class is independent of the set type being used by a product master class of a type of product that is purchased during the second type of sale represented by the second sales order class;

storing the second sales order class;

receiving a third user request to create a third sales order instance for the second sales order class, wherein the third sales order instance is an electronic database object that is an instance of the second sales order class and represents a sale of one or more products;

determining, in response to receiving the third user request, that the association of the set type with the second sales order class is independent of the set type being used by a product master class of a type of product that is purchased during the second type of sale represented by the second sales order class;

applying, in response to determining that the association of the set type with the second sales order class is independent of the set type being used by a product master class of a type of product that is purchased during the second type of sale represented by the second sales order class, the allowed values and the default value for the set type to the third sales order instance; and storing the third sales order instance.

8. The computer program product of claim 7, wherein the operations further comprise providing a display of a first check box to prompt a user to input at least one of the third user inputs for specifying that the association of the set type with the first sales order class is dependent of the set type being used by a product master class of a type of product that is purchased during the first type of sale represented by the first sales order class, and a second check box to prompt a user to input at least one of the fifth user inputs for specifying that the association of the set type with the second sales order class is independent of the set type being used by a product master class of a type of product that is purchased during the second type of sale represented by the second sales order class.

* * * * *